US012563587B2

(12) United States Patent
Zhang

(10) Patent No.: US 12,563,587 B2
(45) Date of Patent: Feb. 24, 2026

(54) METHOD AND DEVICE IN A NODE USED FOR WIRELESS COMMUNICATION

(71) Applicant: Xiaobo Zhang, Shanghai (CN)

(72) Inventor: Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 466 days.

(21) Appl. No.: 17/741,494

(22) Filed: May 11, 2022

(65) Prior Publication Data

US 2022/0272722 A1      Aug. 25, 2022

Related U.S. Application Data

(63) Continuation of application No. PCT/CN2021/077541, filed on Feb. 24, 2021.

(30) Foreign Application Priority Data

Feb. 25, 2020    (CN) .......................... 202010114967.8

(51) Int. Cl.
    *H04W 72/566*        (2023.01)
    *H04L 5/00*          (2006.01)
(52) U.S. Cl.
    CPC ......... *H04W 72/569* (2023.01); *H04L 5/0048* (2013.01)
(58) Field of Classification Search
    CPC . H04W 72/569; H04W 72/121; H04W 72/21; H04W 72/0453; H04L 5/0048;
    (Continued)

(56) References Cited

U.S. PATENT DOCUMENTS 10,779,302 B2 *   9/2020   Zhang ................. H04W 72/121
2017/0013612 A1 *  1/2017   Nayeb Nazar ........ H04W 72/21
                        (Continued)

FOREIGN PATENT DOCUMENTS

CN       105191441 B  *  8/2019  .......... H04W 52/281
CN       110679102 A     1/2020
                        (Continued)

OTHER PUBLICATIONS

ISR received in application No. PCT/CN2021/077541 dated Apr. 23, 2021.
                        (Continued)

*Primary Examiner* — Ayaz R Sheikh
*Assistant Examiner* — Louis Samara
(74) *Attorney, Agent, or Firm* — VOLPE KOENIG

(57)                ABSTRACT

The present disclosure provides a method and a device in a node used for wireless communications. A first receiver receives a first signaling and a first signal group; and a first transmitter transmits a second signal in a first time-frequency resource, the second signal carrying a first bit block and first information; herein, the first bit block carries user data; the first signaling comprises scheduling information of the second signal; the first information comprises information indicating whether a signal in the first signal group is correctly received; the first time-frequency resource comprises a first time-domain resource; a first symbol set is composed of modulation symbol(s) generated by the first information, and a number of symbols comprised in the first symbol set mapped to the first time-domain resource is related to the priority of the first bit block and the priority of the first information.

16 Claims, 4 Drawing Sheets

(58) Field of Classification Search
　　CPC ... H04L 1/1822; H04L 1/1861; H04L 1/1896;
　　　　H04L 5/0094; H04L 1/0069; H04J 3/1658
　　See application file for complete search history.

(56) References Cited

U.S. PATENT DOCUMENTS

| | | | | |
|---|---|---|---|---|
| 2019/0319750 A1* | 10/2019 | Khosravirad | ......... | H04L 1/0069 |
| 2020/0120693 A1* | 4/2020 | Wu | .................... | H04W 72/1263 |
| 2020/0177305 A1* | 6/2020 | Zhang | ................... | H04J 3/1658 |
| 2021/0144700 A1* | 5/2021 | Lee | ......................... | H04L 5/001 |
| 2021/0297999 A1* | 9/2021 | Kim | ................... | H04W 72/0453 |
| 2022/0216965 A1* | 7/2022 | Gao | ...................... | H04L 5/0091 |
| 2022/0346071 A1* | 10/2022 | Park | ................... | H04W 72/569 |

FOREIGN PATENT DOCUMENTS

| | | | | | |
|---|---|---|---|---|---|
| WO | WO-2015109544 A1 | * | 7/2015 | .......... | H04W 52/281 |
| WO | WO-2018058745 A1 | * | 4/2018 | ........ | H04W 72/1273 |
| WO | WO-2018208087 A1 | * | 11/2018 | ............ | H04W 72/21 |

OTHER PUBLICATIONS

First Office Action of Chinses patent application No. CN202010114967.8 dated Mar. 14, 2022.
First Search Report of Chinses patent application No. CN202010114967.8 dated Mar. 7, 2022.
Notification to Grant Patent Right for Invention of Chinses patent application No. CN202010114967.8 dated Jul. 4, 2022.
Huawei, HiSilicon On UCI transmission over PUCCH and PUSCH 3GPP TSG RAN WG1 NR Ad Hoc Meeting R1-1700399 Jan. 9, 2017.
OPPO Summary of offline discussion on UCI enhancements for URLLC 3GPP TSG RAN WG1 #96 R1-1903431 Feb. 25, 2019.

Qualcomm Incorporated Summary#3 of CRs on UCI multiplexing on PUSCH 3GPP TSG-RAN WG1 Meeting #97 R1-1907794 May 15, 2019.
Remaining issues on configured grant for NR-U ZTE, Sanechips 3GPP TSG RAN WG1 Meeting #99 R1-1911825 Nov. 9, 2019.
Vivo Feature lead summary on Configured grant enhancement 3GPP TSG RAN WG1#99 R1-1912016 Nov. 18, 2019.
First Office Action received in application No. IN20221705216.3 dated Dec. 28, 2023.
First Office Action of Chinese patent application No. CN202210973686.7 dated Feb. 24, 2024.
First Search Report of Chinese patent application No. CN202210973686.7 dated Feb. 23, 2024.
Third Generation Partnership Project, "Technical Specification Group Radio Access Network; NR; Physical channels and modulation (Release 16)," 3GPP TS 38.211 V16.0.0 (Dec. 2019).
Third Generation Partnership Project, "Technical Specification Group Radio Access Network; NR; Multiplexing and channel coding (Release 16)," 3GPP TS 38.212 V16.0.0 (Dec. 2019).
Third Generation Partnership Project, "Technical Specification Group Radio Access Network; NR; Physical layer procedures for control (Release 15)," 3GPP TS 38.213 V16.0.0 (Dec. 2019).
Third Generation Partnership Project, "Technical Specification Group Radio Access Network; NR; Physical layer procedures for data (Release 16)," 3GPP TS 38.214 V16.0.0 (Dec. 2019).
Third Generation Partnership Project, "Technical Specification Group Radio Access Network; NR; Medium Access Control (MAC) protocol specification (Release 15)," 3GPP TS 38.321 V15.8.0 (Dec. 2019).
Third Generation Partnership Project, "Technical Specification Group Radio Access Network NR Radio Resource Control (RRC) protocol specification (Release 15)," 3GPP TS 38.331 V15.8.0 (Dec. 2019).

* cited by examiner

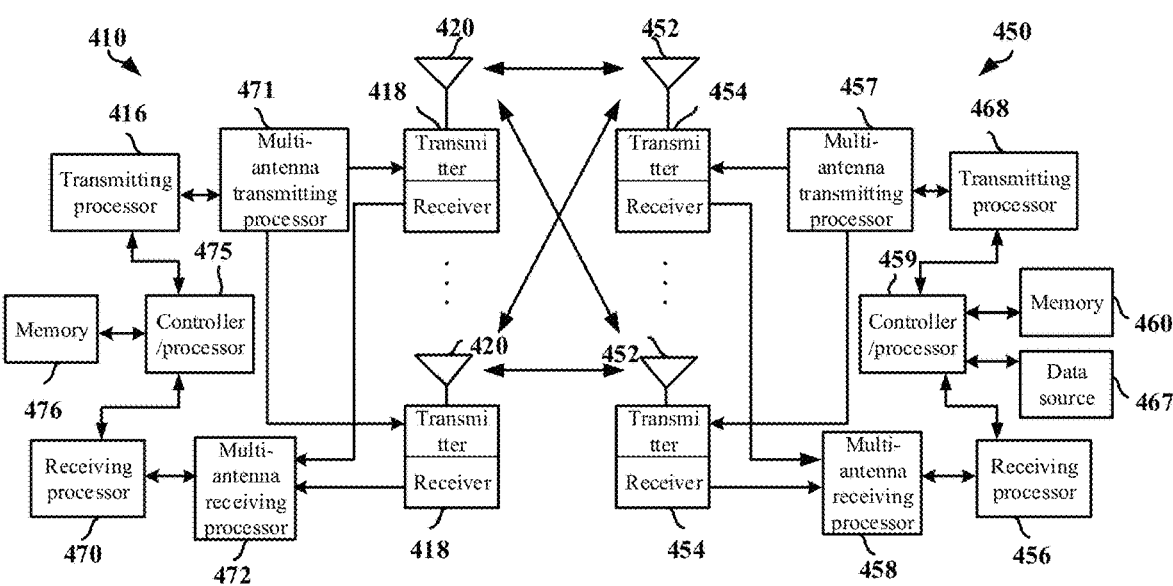

FIG. 4

First node U1 | Second node U2

S5201. transmitting first signaling group

←first signaling group

S5101. receiving first signaling group

F51.optional

S521. transmitting first signaling

←first signaling

S511.receiving first signaling

S522. transmitting first signal group

←first signal group

S512. receiving first signal group

S513. transmitting second signal in first time-frequency resource second signal→

S523. receiving second signal in first time-frequency resource

S5102. transmitting first reference signal in first time-frequency resource first reference signal→

S5202. receiving first reference signal in first time-frequency resource

F52. optional

End          End

FIG. 5

METHOD AND DEVICE IN A NODE USED FOR WIRELESS COMMUNICATION

CROSS REFERENCE TO RELATED APPLICATIONS

This application is a continuation of International Application No. PCT/CN2021/077541, filed Feb. 24, 2021, claims the priority benefit of Chinese Patent Application No. 202010114967.8, filed on Feb. 25, 2020, the full disclosure of which is incorporated herein by reference.

TECHNICAL FIELD

The present disclosure relates to transmission methods and devices in wireless communication systems, and in particular to a method and device of radio signal transmission in a wireless communication system that support cellular networks.

BACKGROUND

For the purpose of supporting more demanding Ultra Reliable and Low Latency Communication (URLLC) traffics in a 5G system, for example, with higher reliability (e.g., a target BLER is $10^{-6}$) or with lower delay (e.g., 0.5-1 ms), the 3rd Generation Partner Project (3GPP) Radio Access Network (RAN) #80 Plenary approved a Study Item (SI) of New Radio (NR) URLLC enhancement. In order to support URLLC traffics with higher reliability and lower latency, the 3GPP has agreed upon an introduction of data transmissions and Uplink Control Information (UCI) feedbacks of various priorities in URLLC.

SUMMARY

In the 3GPP Release 15, UCI can be multiplexed with data into a same channel, such as a Physical Uplink Shared Channel (PUSCH), so as to improve the system efficiency. After the introduction of priority information, however, how to multiplex data with control information of different priorities, including High Priority and Low Priority, in a proper manner becomes a problem in need of solving.

To address the above problem, the present disclosure provides a solution. It should be noted that though the present disclosure only took the NR URLLC scenario for example or as a typical application scenario in the statement above, it is also applicable to other scenarios, where similar technical effects can be achieved. If no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict. Particularly, for interpretations of the terminology, nouns, functions and variants (unless otherwise specified) in the present disclosure, refer to definitions given in TS36 series, TS38 series and TS37 series of 3GPP specifications.

The present disclosure provides a method in a first node for wireless communications, comprising:

receiving a first signaling and a first signal group; and transmitting a second signal in a first time-frequency resource, the second signal carrying a first bit block and first information;

herein, the first bit block carries user data; the first signaling comprises scheduling information of the second signal; the first information comprises information indicating whether one or more signals in the first signal group is/are correctly received; the first time-frequency resource comprises a first time-domain resource in time domain; a first symbol set is composed of modulation symbol(s) generated by the first information, and a number of symbols comprised in the first symbol set mapped to the first time-domain resource is related to a priority of the first bit block and a priority of the first information.

In one embodiment, a problem to be solved in the present disclosure is how to guarantee the transmission performance of High-priority information effectively when control information and data of various priorities are multiplexed into a same channel, for instance, a PUSCH.

In one embodiment, characteristics of the above method include that mapping modes of control information and data on a time-frequency resource are determined according to the priority of the control information and data.

In one embodiment, characteristics of the above method include that when control information and data of various priorities are multiplexed into a same channel, the priority of the control information and the priority of the data are jointly used to determine a resource mapping strategy of modulation symbols.

In one embodiment, advantages of the above method include that when control information and data of various priorities are multiplexed into a same channel, the priority of the control information and the priority of the data are jointly used to determine mapping modes of the control information and data on time-frequency resources, thus enabling more reliable transmission of High-priority information, such as High-priority control information or High-priority data.

According to one aspect of the present disclosure, the above method is characterized in that:

transmitting a first reference signal in the first time-frequency resource, a time-domain resource occupied by the first reference signal being adjacent to the first time-domain resource.

According to one aspect of the present disclosure, the above method is characterized in that:

a second symbol set is composed of modulation symbol(s) generated by the first bit block, and a number of symbols comprised in the second symbol set mapped to the first time-domain resource is related to the priority of the first bit block and the priority of the first information.

According to one aspect of the present disclosure, the above method is characterized in that:

when the priority of the first bit block is higher than the priority of the first information, the number of symbols comprised in the first symbol set mapped to the first time-domain resource is equal to a first value; otherwise, the number of symbols comprised in the first symbol set mapped to the first time-domain resource is equal to a second value; the second value is greater than the first value.

In one embodiment, advantages of the above method include that by mapping as much as High-priority information (e.g., High-priority UCI or High-priority data) onto a time-domain resource in proximity to Demodulation Reference Signals (DMRS), the demodulation performance of High-priority information can be enhanced.

In one embodiment, advantages of the above method include that when Low-priority UCI and High-priority data are multiplexed into a same PUSCH, more data of High priority will be mapped to a time-domain resource in proximity to DMRS to improve the reception performance of High-priority data.

According to one aspect of the present disclosure, the above method is characterized in that:

when the priority of the first bit block is higher than the priority of the first information, a second time-domain resource is used for carrying the first symbol set; the second time-domain resource is not adjacent to a time-domain resource occupied by the first reference signal.

According to one aspect of the present disclosure, the above method is characterized in that:

the first information comprises a second bit block, and a number of bits comprised in the second bit block is greater than a third value.

According to one aspect of the present disclosure, the above method is characterized in comprising:

receiving a first signaling group;

herein, the first signaling group comprises scheduling information of the first signal group, a second signaling is a last signaling in the first signaling group, and the second signaling indicates a second time-frequency resource, the second time-frequency resource being reserved for the first information; the second time-frequency resource and the first time-frequency resource are overlapping in time domain.

According to one aspect of the present disclosure, the above method is characterized in that the first node is a UE.

According to one aspect of the present disclosure, the above method is characterized in that the first node is a relay node.

The present disclosure provides a method in a second node for wireless communications, comprising:

transmitting a first signaling and a first signal group; and receiving a second signal in a first time-frequency resource, the second signal carrying a first bit block and first information;

herein, the first bit block carries user data; the first signaling comprises scheduling information of the second signal; the first information comprises information indicating whether one or more signals in the first signal group is/are correctly received; the first time-frequency resource comprises a first time-domain resource in time domain; a first symbol set is composed of modulation symbol(s) generated by the first information, and a number of symbols comprised in the first symbol set mapped to the first time-domain resource is related to a priority of the first bit block and a priority of the first information.

According to one aspect of the present disclosure, the above method is characterized in that:

receiving a first reference signal in the first time-frequency resource, a time-domain resource occupied by the first reference signal being adjacent to the first time-domain resource.

According to one aspect of the present disclosure, the above method is characterized in that:

a second symbol set is composed of modulation symbol(s) generated by the first bit block, and a number of symbols comprised in the second symbol set mapped to the first time-domain resource is related to the priority of the first bit block and the priority of the first information.

According to one aspect of the present disclosure, the above method is characterized in that:

when the priority of the first bit block is higher than the priority of the first information, the number of symbols comprised in the first symbol set mapped to the first time-domain resource is equal to a first value; otherwise, the number of symbols comprised in the first symbol set mapped to the first time-domain resource is equal to a second value; the second value is greater than the first value.

According to one aspect of the present disclosure, the above method is characterized in that:

when the priority of the first bit block is higher than the priority of the first information, a second time-domain resource is used for carrying the first symbol set; the second time-domain resource is not adjacent to a time-domain resource occupied by the first reference signal.

According to one aspect of the present disclosure, the above method is characterized in that:

the first information comprises a second bit block, and a number of bits comprised in the second bit block is greater than a third value.

According to one aspect of the present disclosure, the above method is characterized in that:

transmitting a first signaling group;

herein, the first signaling group comprises scheduling information of the first signal group, a second signaling is a last signaling in the first signaling group, and the second signaling indicates a second time-frequency resource, the second time-frequency resource being reserved for the first information; the second time-frequency resource and the first time-frequency resource are overlapping in time domain.

According to one aspect of the present disclosure, the above method is characterized in that the second node is a base station.

According to one aspect of the present disclosure, the above method is characterized in that the second node is a UE.

According to one aspect of the present disclosure, the above method is characterized in that the second node is a relay node.

The present disclosure provides a first node for wireless communications, comprising:

a first receiver, receiving a first signaling and a first signal group; and a first transmitter, transmitting a second signal in a first time-frequency resource, the second signal carrying a first bit block and first information;

herein, the first bit block carries user data; the first signaling comprises scheduling information of the second signal; the first information comprises information indicating whether one or more signals in the first signal group is/are correctly received; the first time-frequency resource comprises a first time-domain resource in time domain; a first symbol set is composed of modulation symbol(s) generated by the first information, and a number of symbols comprised in the first symbol set mapped to the first time-domain resource is related to a priority of the first bit block and a priority of the first information.

The present disclosure provides a second node for wireless communications, comprising:

a second transmitter, transmitting a first signaling and a first signal group;

a second receiver, receiving a second signal in a first time-frequency resource, the second signal carrying a first bit block and first information;

herein, the first bit block carries user data; the first signaling comprises scheduling information of the second signal; the first information comprises information indicating whether one or more signals in the first signal group is/are correctly received; the first time-frequency resource comprises a first time-domain resource in time domain; a first symbol set is composed of modulation symbol(s) generated by the first information, and a number of symbols comprised in the first symbol set mapped to the first time-domain resource is related to a priority of the first bit block and a priority of the first information.

In one embodiment, the present disclosure is advantageous over conventional schemes in the following aspects:

Control information and data of various priorities can be reasonably multiplexed into a same channel.

The priority of control information and the priority of data are jointly used to determine a mapping mode of the control information and data on a time-frequency resource, so that High-priority information (for instance, high-priority control information or high-priority data) can be transmitted more reliably.

Mapping more information of high priority, such as high-priority UCI or high-priority data, onto a time-domain resource near to DMRS helps strengthen the demodulation performance of high-priority information.

BRIEF DESCRIPTION OF THE DRAWINGS

Other features, objects and advantages of the present disclosure will become more apparent from the detailed description of non-restrictive embodiments taken in conjunction with the following drawings:

FIG. 4 illustrates a schematic diagram of a first communication device and a second communication device according to one embodiment of the present disclosure.

FIG. 5 illustrates a flowchart of wireless transmission according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figures 1, 2, 3:
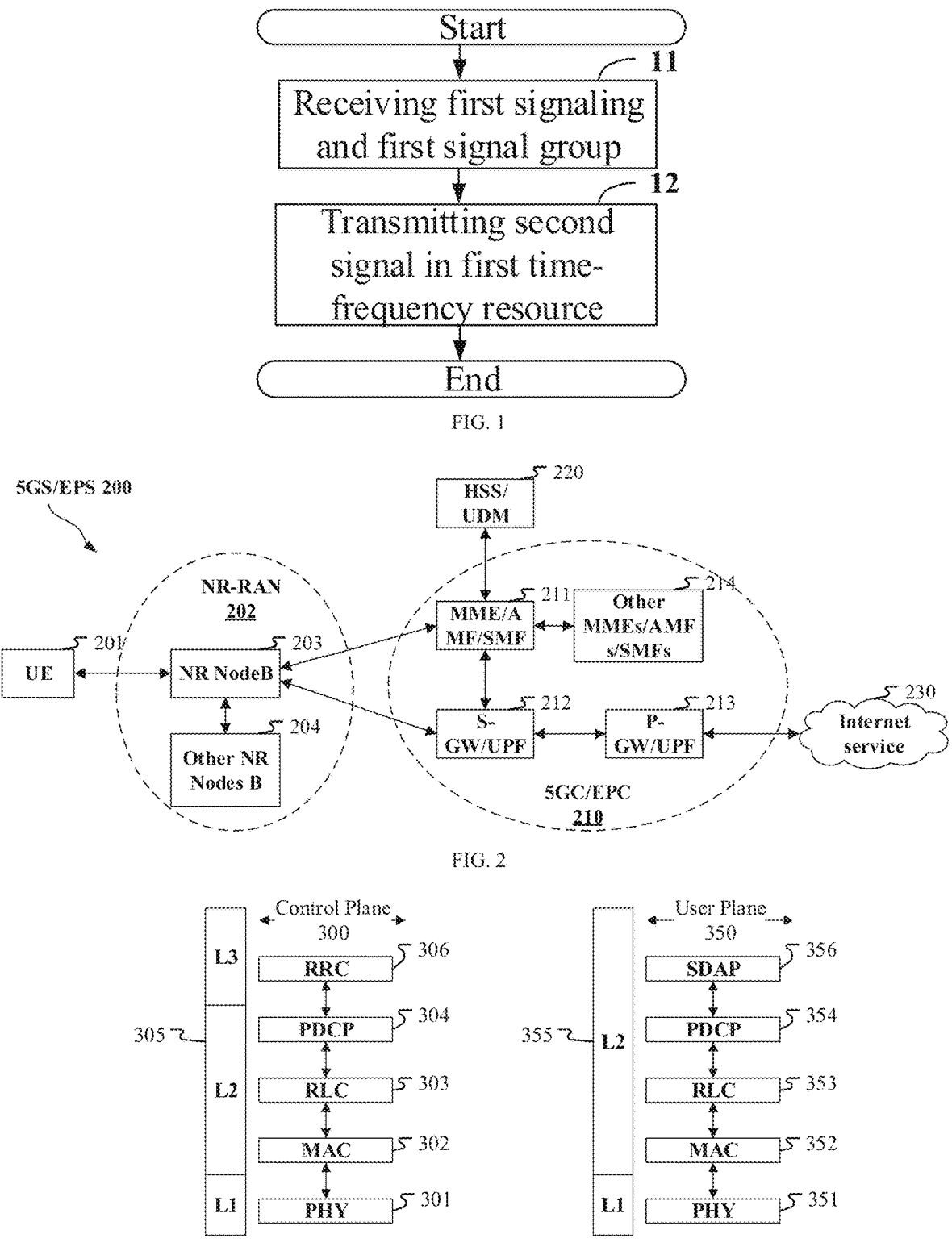
FIG. 1 illustrates a flowchart of processing of a first node according to one embodiment of the present disclosure.
FIG. 2 illustrates a schematic diagram of a network architecture according to one embodiment of the present disclosure.
FIG. 3 illustrates a schematic diagram of a radio protocol architecture of a user plane and a control plane according to one embodiment of the present disclosure.

Embodiment 1 illustrates a flowchart of processing of a first node according to one embodiment of the present disclosure, as shown in FIG. 1.

In Embodiment 1, the first node in the present disclosure receives a first signaling and a first signal group in step 11, and then transmits a second signal in a first time-frequency resource in step 12.

In Embodiment 1, the second signal carries a first bit block and first information; the first bit block carries user data; the first signaling comprises scheduling information of the second signal; the first information comprises information indicating whether one or more signals in the first signal group is/are correctly received; the first time-frequency resource comprises a first time-domain resource in time domain; a first symbol set is composed of modulation symbol(s) generated by the first information, and a number of symbols comprised in the first symbol set mapped to the first time-domain resource is related to a priority of the first bit block and a priority of the first information.

In one embodiment, the first symbol group comprises a positive integer number of baseband signal(s).

In one embodiment, the first symbol group comprises a positive integer number of radio signal(s).

In one embodiment, the first symbol group comprises a positive integer number of radio frequency signal(s).

In one embodiment, the second signal is a baseband signal.

In one embodiment, the second signal is a radio signal.

In one embodiment, the second signal is a radio frequency signal.

In one embodiment, the first signaling is dynamically configured.

In one embodiment, the first signaling is a physical layer signaling.

In one embodiment, the first signaling is a Downlink Control Information (DCI) signaling.

In one embodiment, the first signaling is a DownLink (DL) Grant DCI signaling.

In one embodiment, the first signaling is transmitted on a downlink physical layer control channel (i.e., a downlink channel only capable of carrying a physical layer signaling).

In one subembodiment, the downlink physical layer control channel is a Physical Downlink Control CHannel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, each signal in the first signal group is transmitted on a downlink physical layer data channel (i.e., a downlink channel capable of carrying physical layer data).

In one subembodiment, the downlink physical layer data channel is a Physical Downlink Shared CHannel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, the first signaling is DCI format 1_0, for the specific definition of the DCI format 10, refer to 3GPP TS38.212, section 7.3.1.2.

In one embodiment, the first signaling is DCI format 1_1, for the specific definition of the DCI format 11, refer to 3GPP TS38.212, section 7.3.1.2.

In one embodiment, the first signal group comprises M signals, and the first information comprises information indicating whether each of the M signals is correctly received.

In one embodiment, M is a positive integer.

In one embodiment, M is 1 or a positive integer greater than 1.

In one embodiment, M is no greater than 10240.

In one embodiment, the first information is a HARQ-ACK Codebook (CB), for the way of generating the first information, refer to 3GPP TS38.213, section 9.1.

In one embodiment, the first bit block comprises user data, and the first information comprises a control signaling.

In one embodiment, the first time-frequency resource is reserved for transmission of the first bit block.

In one embodiment, the first time-frequency resource is a time-frequency resource belonging to an uplink physical layer data channel (i.e., an uplink channel capable of carrying physical layer data).

In one subembodiment, the uplink physical layer data channel is a Physical Uplink Shared Channel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUSCH (NB-PUSCH).

In one embodiment, the second signal is transmitted on an uplink physical layer data channel (i.e., an uplink channel capable of carrying physical layer data).

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, the first time-frequency resource is a PUSCH.

In one embodiment, the first time-frequency resource comprises a positive integer number of Resource Element(s) (RE(s)).

In one embodiment, the first time-frequency resource comprises a positive integer number of multicarrier symbol(s) in time domain, and comprises a positive integer number of subcarrier(s) in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

In one embodiment, the first time-frequency resource comprises a positive integer number of multicarrier symbol(s) in time domain, and the first time-domain resource is one of the positive integer number of multicarrier symbol(s).

In one embodiment, the first time-frequency resource comprises $K1$ multicarrier symbols in time domain, and the first time-domain resource is $K2$ multicarrier symbol(s) of the $K1$ multicarrier symbols; $K2$ is no greater than $K1$.

In one embodiment, $K2$ is a positive integer.

In one embodiment, $K1$ is a positive integer.

In one embodiment, $K2$ is no greater than 14.

In one embodiment, $K1$ is no greater than 14.

In one embodiment, $K2$ is no greater than 143360.

In one embodiment, $K1$ is no greater than 143360

In one embodiment, the first time-domain resource is an OFDM symbol.

In one embodiment, the first bit block comprises a positive integer number of bit(s).

In one embodiment, the first bit block comprises an UL-SCH information bit.

In one embodiment, the UL-SCH information bit is used for carrying the user data.

In one embodiment, the first information comprises a positive integer number of bit(s).

In one embodiment, the first information comprises HARQ-ACK Information.

In one embodiment, all bits in the first information carry a HARQ-ACK CB.

In one embodiment, the scheduling information of the second signal comprises one or more of a time-domain resource occupied, a frequency-domain resource occupied, an MCS, configuration information of DMRS, a HARQ process ID, a Redundancy Version (RV), an NDI or a priority.

In one embodiment, the first information comprises HARQ-ACK information of a positive integer number of signal(s) comprised in the first signal group.

In one embodiment, the phrase of symbols comprised in the first symbol set mapped to the first time-domain resource includes symbols in the first symbol set transmitted on the first time-domain resource after a first process; the first process includes some or all of Mapping to Resource Element, OFDM Baseband Signal Generation and Modulation and Upconversion.

In one embodiment, the phrase of symbols comprised in the first symbol set mapped to the first time-domain resource includes symbols in the first symbol set mapped onto a resource element comprised by the first time-domain resource.

In one subembodiment, the resource element comprised by the first time-domain resource comprises a positive integer number of RE(s).

In one embodiment, the priority of the first bit block and the priority of the first information are jointly used to determine whether a number of symbols comprised in the first symbol set mapped to the first time-domain resource is greater than 0.

In one embodiment, the priority of the first bit block and the priority of the first information are jointly used to determine a number of symbols comprised in the first symbol set mapped to the first time-domain resource.

In one embodiment, the number of symbols comprised in the first symbol set mapped to the first time-domain resource is equal to 0 or a positive integer.

In one embodiment, the phrase that a first symbol set is composed of modulation symbol(s) generated by the first information includes that the first symbol set is composed of modulation symbol(s) generated by the first information sequentially through part of or all steps of CRC Insertion, Segmentation, CB-level CRC Insertion, Channel Coding, Rate Matching, Concatenation, Scrambling, Modulation, Layer Mapping and Precoding.

In one embodiment, the second signal comprises a first sub-signal, and the first sub-signal is a signal generated by the first bit block through a first process; the first process includes part or all of CRC Insertion, Segmentation, CB-level CRC Insertion, Channel Coding, Rate Matching, Concatenation, Scrambling, Modulation, Layer Mapping and Precoding, Mapping to Resource Element, OFDM Baseband Signal Generation and Modulation and Upconversion.

In one embodiment, the first time-domain resource is not sufficient for carrying all of the first sub-signal.

In one embodiment, the second signal comprises a second sub-signal, and the second sub-signal is a signal generated by the first information through a second process; the second process includes part or all of CRC Insertion, Segmentation, CB-level CRC Insertion, Channel Coding, Rate Matching, Concatenation, Scrambling, Modulation, Layer Mapping and Precoding, Mapping to Resource Element, OFDM Baseband Signal Generation and Modulation and Upconversion.

In one embodiment, the first bit block comprises a Transport Block (TB), a Code Block or a Code Block Group (CBG).

In one embodiment, the first bit block is a TB.

In one embodiment, the first bit block comprises a positive integer number of CBG(s).

In one embodiment, the first symbol set is mapped to the first time-frequency resource first through frequency domain.

In one embodiment, the modulation symbol refers to Quadrature Phase Shift Keying (QPSK) modulation symbol.

In one embodiment, the modulation symbol refers to Binary Phase Shift Keying (BPSK) modulation symbol.

In one embodiment, the modulation symbol refers to Quadrature Amplitude Modulation (QAM) modulation symbol.

In one embodiment, in time domain, the first time-frequency resource comprises multiple OFDM symbols, the first time-domain resource is a first OFDM symbol after one or more OFDM symbols occupied by the first reference signal, and the second time-domain resource is an OFDM symbol other than a first OFDM symbol after any OFDM symbol occupied by the first reference signal; when the priority of the first bit block is higher than the priority of the first information, the second time-domain resource is used for carrying the first symbol set; otherwise, the first time-domain resource is used for carrying the first symbol set.

In one subembodiment, the phrase that the second time-domain resource is used for carrying the first symbol set includes that a number of symbols comprised in the first symbol set mapped to the second time-domain resource is greater than 0.

In one subembodiment, the phrase that the first time-domain resource is used for carrying the first symbol set includes that a number of symbols comprised in the first symbol set mapped to the first time-domain resource is greater than 0.

In one embodiment, the phrase of symbols in the first symbol set mapped to the second time-domain resource includes symbols in the first symbol set mapped onto a resource element comprised by the second time-domain resource.

Embodiment 2

Embodiment 2 illustrates a schematic diagram of a network architecture according to the present disclosure, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called a 5G System/ Evolved Packet System (5GS/EPS) 200 or other appropriate terms, which may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrowband physical network equipment, machine-type communication equipment, land vehicles, automobiles, vehicle-mounted equipment, vehicle-mounted communications units, wearable s, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW) 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services.

In one embodiment, the first node in the present disclosure includes the UE 201.

In one embodiment, the second node in the present disclosure includes the gNB203.

In one embodiment, the UE201 supports MIMO wireless communications.

In one embodiment, the gNB203 supports MIMO wireless communications.

Embodiment 3

Embodiment 3 illustrates a schematic diagram of a radio protocol architecture of a user plane and a control plane according to one embodiment of the present disclosure, as shown in FIG. 3.

Embodiment 3 illustrates a schematic diagram of an example of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first bit block in the present disclosure is generated by the RRC sublayer 306 or the SDAP sublayer 356.

In one embodiment, the first bit block in the present disclosure is generated by the MAC sublayer 302 or the MAC sublayer 352.

In one embodiment, the first information in the present disclosure is generated by the RRC sublayer 306.

In one embodiment, the first information in the present disclosure is generated by the MAC sublayer 302.

In one embodiment, the first signaling in the present disclosure is generated by the PHY301 or the PHY351.

In one embodiment, the first signal group in the present disclosure is generated by the PHY301 or the PHY351.

In one embodiment, the second signal in the present disclosure is generated by the PHY301 or the PHY351.

In one embodiment, the first signaling group in the present disclosure is generated by the PHY301 or the PHY351.

In one embodiment, the first reference signal in the present disclosure is generated by the PHY301 or the PHY351.

Embodiment 4

Embodiment 4 illustrates a schematic diagram of a first communication device and a second communication device according to one embodiment of the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission between the first communication device 410 and the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing. The controller/processor 459 is also responsible for error detection using ACK and/or NACK protocols to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network. The controller/processor 475 is also responsible for error detection using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives the first signaling and the first signal group of the present disclosure; and transmits the second signal of the present disclosure in the first time-frequency resource of the present disclosure, the second signal carrying the first bit block of the present disclosure and the first information of the present disclosure. The first bit block carries user data; the first signaling comprises scheduling information of the second signal; the first information comprises information indicating whether one or more signals in the first signal group is/are correctly received; the first time-frequency resource comprises a first time-domain resource of the present disclosure; the first symbol set of the present disclosure is composed of modulation symbol(s) generated by the first information, and a number of symbols comprised in the first symbol set mapped to the first time-domain resource is related to a priority of the first bit block and a priority of the first information.

In one embodiment, the second communication device 450 comprises a memory that stores computer readable instruction program, the computer readable instruction program generates actions when executed by at least one processor, which include: receiving the first signaling and the first signal group of the present disclosure; and transmitting the second signal of the present disclosure in the first time-frequency resource of the present disclosure, the second signal carrying the first bit block of the present disclosure and the first information of the present disclosure. The first bit block carries user data; the first signaling comprises scheduling information of the second signal; the first information comprises information indicating whether one or more signals in the first signal group is/are correctly received; the first time-frequency resource comprises a first time-domain resource of the present disclosure; the first symbol set of the present disclosure is composed of modulation symbol(s) generated by the first information, and a number of symbols comprised in the first symbol set mapped to the first time-domain resource is related to a priority of the first bit block and a priority of the first information.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first signaling and the first signal group of the present disclosure; and receives the second signal of the present disclosure in the first time-frequency resource of the present disclosure, the second signal carrying the first bit block of the present disclosure and the first information of the present disclosure. The first bit block carries user data;

the first signaling comprises scheduling information of the second signal; the first information comprises information indicating whether one or more signals in the first signal group is/are correctly received; the first time-frequency resource comprises a first time-domain resource of the present disclosure; the first symbol set of the present disclosure is composed of modulation symbol(s) generated by the first information, and a number of symbols comprised in the first symbol set mapped to the first time-domain resource is related to a priority of the first bit block and a priority of the first information.

In one embodiment, the first communication device 410 comprises a memory that stores computer readable instruction program, the computer readable instruction program generates actions when executed by at least one processor, which include: transmitting the first signaling and the first signal group of the present disclosure; and receiving the second signal of the present disclosure in the first time-frequency resource of the present disclosure, the second signal carrying the first bit block of the present disclosure and the first information of the present disclosure. The first bit block carries user data; the first signaling comprises scheduling information of the second signal; the first information comprises information indicating whether one or more signals in the first signal group is/are correctly received; the first time-frequency resource comprises a first time-domain resource of the present disclosure; the first symbol set of the present disclosure is composed of modulation symbol(s) generated by the first information, and a number of symbols comprised in the first symbol set mapped to the first time-domain resource is related to a priority of the first bit block and a priority of the first information.

In one embodiment, the first node in the present disclosure includes the second communication device 450.

In one embodiment, the second node in the present disclosure includes the first communication device 410.

In one embodiment, the second communication device 450 is a UE.

In one embodiment, the second communication device 450 is a base station.

In one embodiment, the first communication device 410 is a UE.

In one embodiment, at least one of the antenna 420, the receiver 418, the receiving processor 470, the multi-antenna receiving processor 472, the controller/processor 475 or the memory 476 is used for receiving the second signal in the present disclosure.

In one embodiment, at least one of the antenna 452, the transmitter 454, the transmitting processor 468, the multi-antenna transmitting processor 457, the controller/processor 459, the memory 460 or the data source 467 is used for transmitting the second signal in the present disclosure.

In one embodiment, at least one of the antenna 420, the receiver 418, the receiving processor 470, the multi-antenna receiving processor 472, the controller/processor 475 or the memory 476 is used for receiving the first reference signal in the present disclosure.

In one embodiment, at least one of the antenna 452, the transmitter 454, the transmitting processor 468, the multi-antenna transmitting processor 457, the controller/processor 459, the memory 460 or the data source 467 is used for transmitting the first reference signal in the present disclosure.

In one embodiment, at least one of the antenna 452, the receiver 454, the receiving processor 456, the multi-antenna receiving processor 458, the controller/processor 459, the memory 460 or the data source 467 is used for receiving the first signaling in the present disclosure.

In one embodiment, at least one of the antenna 420, the transmitter 418, the transmitting processor 416, the multi-antenna transmitting processor 471, the controller/processor 475 or the memory 476 is used for transmitting the first signaling in the present disclosure.

In one embodiment, at least one of the antenna 452, the receiver 454, the receiving processor 456, the multi-antenna receiving processor 458, the controller/processor 459, the memory 460 or the data source 467 is used for receiving the first signaling group in the present disclosure.

In one embodiment, at least one of the antenna 420, the transmitter 418, the transmitting processor 416, the multi-antenna transmitting processor 471, the controller/processor 475 or the memory 476 is used for transmitting the first signaling group in the present disclosure.

In one embodiment, at least one of the antenna 452, the receiver 454, the receiving processor 456, the multi-antenna receiving processor 458, the controller/processor 459, the memory 460 or the data source 467 is used for receiving the first signal group in the present disclosure.

In one embodiment, at least one of the antenna 420, the transmitter 418, the transmitting processor 416, the multi-antenna transmitting processor 471, the controller/processor 475 or the memory 476 is used for transmitting the first signal group in the present disclosure.

In one embodiment, at least one of the antenna 452, the receiver 454, the receiving processor 456, the multi-antenna receiving processor 458, the controller/processor 459, the memory 460 or the data source 467 is used for receiving the second signaling in the present disclosure.

In one embodiment, at least one of the antenna 420, the transmitter 418, the transmitting processor 416, the multi-antenna transmitting processor 471, the controller/processor 475 or the memory 476 is used for transmitting the second signaling in the present disclosure.

Embodiment 5

Embodiment 5 illustrates a flowchart of wireless transmission according to one embodiment of the present disclosure, as shown in FIG. 5. In FIG. 5, a first node U1 and a second node U2 are in communication via an air interface. Dotted-line framed boxes respectively marked by F51 and F52 are optional.

The first node U1 receives a first signaling group in step S5101; receives a first signaling in step S511; receives a first signal group in step S512; transmits a second signal in a first time-frequency resource in step S513; and transmits a first reference signal in the first time-frequency resource in step S5102.

The second node U2 transmits a first signaling group in step S5201; transmits a first signaling in step S521; transmits a first signal group in step S522; receives a second signal in a first time-frequency resource in step S523; and receives a first reference signal in the first time-frequency resource in step S5202.

In Embodiment 5, the second signal carries a first bit block and first information; the first bit block carries user data; the first signaling comprises scheduling information of the second signal; the first information comprises information indicating whether one or more signals in the first signal group is/are correctly received; the first time-frequency resource comprises a first time-domain resource in time domain; a first symbol set is composed of modulation symbol(s) generated by the first information, and a number of symbols comprised in the first symbol set mapped to the first time-domain resource is related to a priority of the first bit block and a priority of the first information; a time-domain resource occupied by the first reference signal being adjacent to the first time-domain resource; a second symbol set is composed of modulation symbol(s) generated by the first bit block, and a number of symbols comprised in the second symbol set mapped to the first time-domain resource is related to the priority of the first bit block and the priority of the first information; the first signaling group comprises scheduling information of the first signal group, a second signaling is a last signaling in the first signaling group, and the second signaling indicates a second time-frequency resource, the second time-frequency resource being reserved for the first information; the second time-frequency resource and the first time-frequency resource are overlapping in time domain; when the priority of the first bit block is higher than the priority of the first information, a second time-domain resource is used for carrying the first symbol set; the second time-domain resource is not adjacent to a time-domain resource occupied by the first reference signal; the first information comprises a second bit block, and a number of bits comprised in the second bit block is greater than a third value.

In one embodiment, when the priority of the first bit block is higher than the priority of the first information, a number of symbols comprised in the first symbol set mapped to the first time-domain resource is equal to the first value; otherwise, the number of symbols comprised in the first symbol set mapped to the first time-domain resource is equal to the second value; the second value is greater than the first value.

In one embodiment, the first node U1 is the first node in the present disclosure.

In one embodiment, the second node U2 is the second node in the present disclosure.

In one embodiment, the first node U1 is a UE.

In one embodiment, the second node U2 is a base station.

In one embodiment, an air interface between the second node U2 and the first node U1 is a Uu interface.

In one embodiment, an air interface between the second node U2 and the first node U1 is a cellular link.

In one embodiment, an air interface between the second node U2 and the first node U1 includes a wireless interface between a base station and a UE.

In one embodiment, each signaling in the first signaling group is dynamically configured.

In one embodiment, each signaling in the first signaling group is a physical layer signaling.

In one embodiment, the first signaling group comprises a positive integer number of DCI signaling(s).

In one embodiment, the first signaling group comprises a positive integer number of DL Grant DCI signaling(s).

In one embodiment, each signaling in the first signaling group is transmitted on a downlink physical layer control channel (i.e., a downlink channel only capable of carrying a physical layer signaling).

In one embodiment, the downlink physical layer control channel is a PDCCH.

In one embodiment, the downlink physical layer control channel is an sPDCCH.

In one embodiment, the downlink physical layer control channel is an NR-PDCCH.

In one embodiment, the downlink physical layer control channel is an NB-PDCCH.

In one embodiment, each signaling in the first signaling group is DCI format 1_0, for the specific definition of the DCI format 10, refer to 3GPP TS38.212, section 7.3.1.2.

In one embodiment, each signaling in the first signaling group is DCI format 1_1, for the specific definition of the DCI format 11, refer to 3GPP TS38.212, section 7.3.1.2.

In one embodiment, the first time-frequency resource comprises a positive integer number of multicarrier symbol(s) in time domain, and the second time-domain resource is one of the positive integer number of multicarrier symbol(s).

In one embodiment, the first time-frequency resource comprises K1 multicarrier symbols in time domain, and the first time-domain resource is K3 multicarrier symbol(s) of the K1 multicarrier symbols; K3 is no greater than K1.

In one embodiment, the second time-domain resource is an OFDM symbol.

In one embodiment, the phrase that a second time-domain resource is used for carrying the first symbol set includes that a number of symbols comprised in the first symbol set mapped to the second time-domain resource is greater than 0.

In one embodiment, the phrase that a second time-domain resource is used for carrying the first symbol set includes that a number of symbols comprised in the first symbol set mapped to a resource element comprised in the second time-domain resource is greater than 0.

In one embodiment, the second bit block comprises a positive integer number of HARQ-ACK bit(s).

In one embodiment, the second bit block comprises a HARQ-ACK CB.

In one embodiment, a number of HARQ-ACK information bits carried by the first information is no greater than a third value.

In one embodiment, a number of HARQ-ACK information bits carried by the first information is greater than a third value.

In one embodiment, the third value is configured by a higher layer signaling.

In one embodiment, the third value is configured by default.

In one embodiment, the third value is equal to 1.

In one embodiment, the third value is equal to 2.

In one embodiment, the third value is equal to 4.

In one embodiment, the third value is equal to a positive integer.

In one embodiment, the third value is no greater than 1706.

In one embodiment, the third value is no greater than 4096.

In one embodiment, the third value is configured by an RRC layer signaling.

In one embodiment, the phrase that the second time-frequency resource and the first time-frequency resource are overlapping in time domain includes that the second time-frequency resource is a PUCCH, while the first time-frequency resource is a PUSCH, and the third bit block and the second signaling are jointly used for selecting the second time-frequency resource from multiple PUCCH resource sets, and there is at least one OFDM symbol of time-domain overlap between the second time-frequency resource and the first time-frequency resource.

In one embodiment, the phrase of symbols comprised in the second symbol set mapped to the first time-domain resource includes symbols in the second symbol set transmitted on the first time-domain resource after a first process; the first process includes some or all of Mapping to Resource Element, OFDM Baseband Signal Generation, and Modulation and Upconversion.

In one embodiment, the phrase of symbols comprised in the second symbol set mapped to the first time-domain resource includes symbols in the second symbol set mapped onto a resource element comprised by the first time-domain resource.

In one embodiment, the phrase that a second symbol set is composed of modulation symbol(s) generated by the first bit block includes that the second symbol set is composed of modulation symbol(s) generated by the first bit block sequentially through part of or all steps of CRC Insertion, Segmentation, CB-level CRC Insertion, Channel Coding, Rate Matching, Concatenation, Scrambling, Modulation, Layer Mapping and Precoding.

In one embodiment, the priority of the first bit block and the priority of the first information are jointly used to determine whether the number of symbols comprised in the second symbol set mapped to the first time-domain resource is greater than 0.

In one embodiment, the second symbol set is mapped to the first time-frequency resource first through frequency domain.

In one embodiment, the first reference signal is a reference signal mapped to the first time-frequency resource that is used for channel measurement.

In one embodiment, the first reference signal is a reference signal mapped to the first time-frequency resource that is used for data demodulation.

In one embodiment, the number of symbols comprised in the first symbol set mapped to the first time-domain resource is equal to a smaller value between: (a) a maximum number of modulation symbols that the first time-domain resource can bear in the first time-frequency resource pool; and (b) a larger value between 0 and a product of a value of an index for priority of the first information and a total number of modulation symbols comprised in the first symbol set being subtracted by a product of a value of an index for priority of the first bit block and a penalty value; the penalty value is configured by a higher layer signaling.

In one subembodiment, the value of the index for the priority of the first information is equal to 0 or 1, and the value of the index for the priority of the first bit block is equal to 0 or 1.

In one subembodiment, the penalty value is equal to a positive integer configured by a higher layer signaling.

In one subembodiment, the higher layer signaling comprises at least one of an RRC signaling or a MAC CE signaling.

In one embodiment, when the priority of the first bit block is higher than the priority of the first information, the number of symbols comprised in the first symbol set mapped to the first time-domain resource is equal to 0; when the priority of the first bit block is no higher than the priority of the first information, the number of symbols comprised in the first symbol set mapped to the first time-domain resource is greater than 0.

In one embodiment, when the priority of the first bit block is lower than the priority of the first information, the number of symbols comprised in the first symbol set mapped to the first time-domain resource is equal to 0; when the priority of the first bit block is no lower than the priority of the first information, the number of symbols comprised in the first symbol set mapped to the first time-domain resource is greater than 0.

In one embodiment, when the priority of the first bit block is no higher than the priority of the first information, the number of symbols comprised in the first symbol set mapped to the first time-domain resource is equal to 0; when the priority of the first bit block is higher than the priority of the first information, the number of symbols comprised in the first symbol set mapped to the first time-domain resource is greater than 0.

In one embodiment, when the priority of the first bit block is no lower than the priority of the first information, the number of symbols comprised in the first symbol set mapped to the first time-domain resource is equal to 0; when the priority of the first bit block is lower than the priority of the first information, the number of symbols comprised in the first symbol set mapped to the first time-domain resource is greater than 0.

In one embodiment, steps marked by the box F51 illustrated in FIG. 5 exist.

In one embodiment, steps marked by the box F51 illustrated in FIG. 5 do not exist.

In one embodiment, steps marked by the box F52 illustrated in FIG. 5 exist.

In one embodiment, steps marked by the box F52 illustrated in FIG. 5 do not exist.

Embodiment 6

Figures 6, 7, 8, 9:
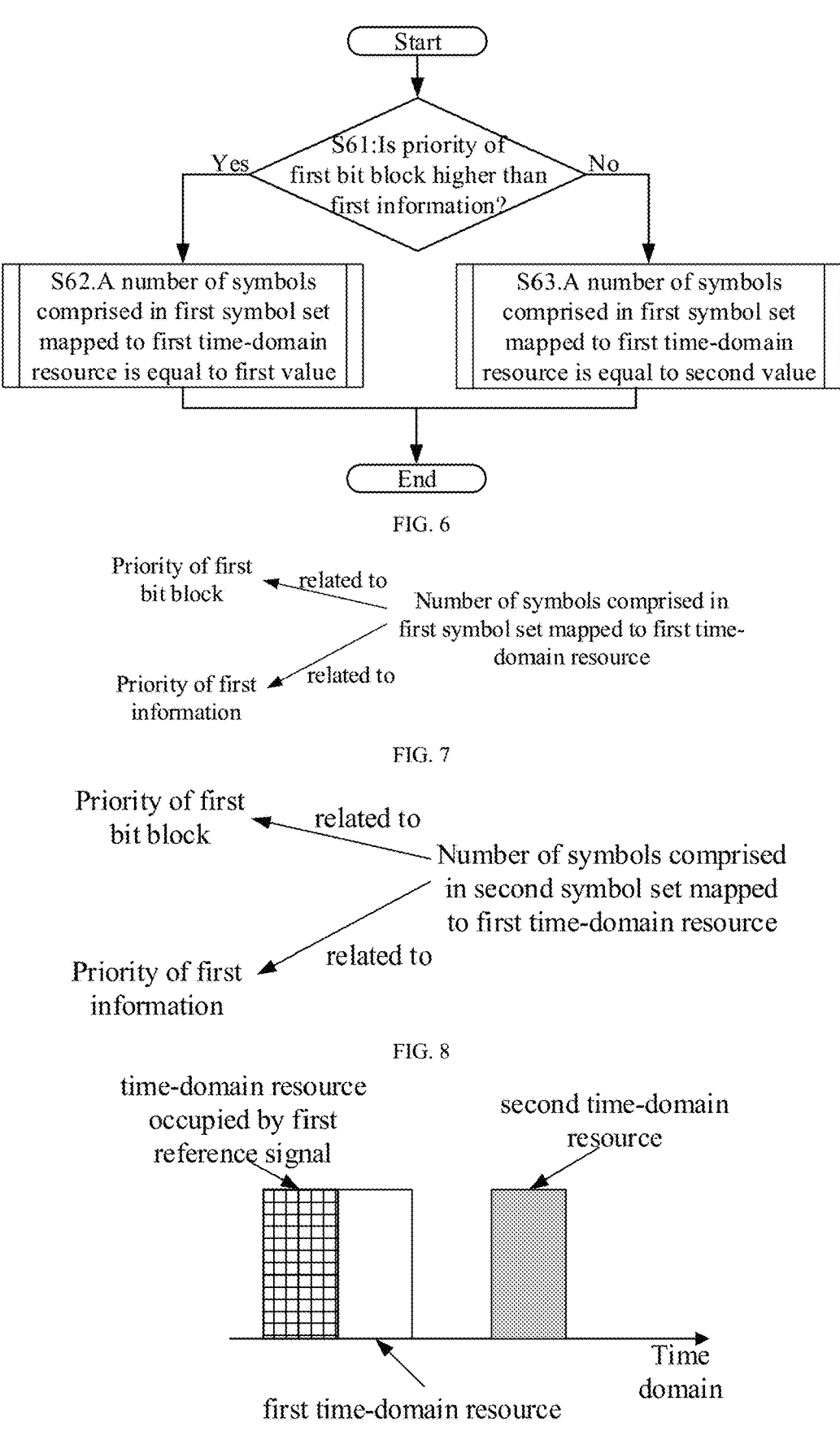
FIG. 6 illustrates a schematic diagram of procedures of determining whether a number of symbols comprised in a first symbol set mapped to a first time-domain resource is a first value or a second value according to one embodiment of the present disclosure.
FIG. 7 illustrates a schematic diagram of relations among a number of symbols comprised in a first symbol set mapped to a first time-domain resource, a priority of a first bit block and a priority of first information according to one embodiment of the present disclosure.
FIG. 8 illustrates a schematic diagram of relations among a number of symbols comprised in a second symbol set mapped to a first time-domain resource, a priority of a first bit block and a priority of first information according to one embodiment of the present disclosure.
FIG. 9 illustrates a schematic diagram of relations among a time-domain resource occupied by a first reference signal, a first time-domain resource and a second time-domain resource according to one embodiment of the present disclosure.

Embodiment 6 illustrates a schematic diagram of procedures of determining whether a number of symbols comprised in a first symbol set mapped to a first time-domain resource is a first value or a second value according to one embodiment of the present disclosure, as shown in FIG. 6.

In Embodiment 6, determine whether the priority of a first bit block is higher than that of first information in step S61; if so, move forward to step S62 to determine that a number of symbols in a first symbol set mapped to a first time-domain resource is equal to a first value; otherwise, move forward to step S63 to determine that the number of symbols comprised in the first symbol set mapped to the first time-domain resource is equal to the first value.

In Embodiment 6, the second value is greater than the first value.

In one embodiment, the first value is equal to 0.

In one embodiment, the first value is greater than 0.

In one embodiment, when the priority of the first bit block is higher than the priority of the first information, a set of symbols comprised in the first symbol set mapped to the first time-domain resource is a first symbol subset; otherwise, the set of symbols comprised in the first symbol set mapped to the first time-domain resource is a second subset; the number of symbols comprised in the second symbol subset is unequal to the number of symbols comprised in the first symbol subset.

In one subembodiment, the first symbol subset is a null set.

In one subembodiment, the symbols in the first symbol subset are mapped to the first time-domain resource through puncturing.

In one subembodiment, the symbols in the second symbol subset are mapped to the first time-domain resource through puncturing.

In one subembodiment, the symbols in the first symbol subset are mapped to the first time-domain resource through rate matching.

In one subembodiment, the symbols in the second symbol subset are mapped to the first time-domain resource through rate matching.

In one embodiment, the first time-domain resource comprises an OFDM symbol.

In one embodiment, the first time-domain resource is a positive integer number of OFDM symbol(s).

In one embodiment, the first time-domain resource is an OFDM symbol.

In one embodiment, the first time-domain resource comprises a multicarrier symbol.

In one embodiment, the first time-domain resource comprises a positive integer number of multicarrier symbol(s).

In one embodiment, when the priority of the first bit block is higher than the priority of the first information, a set of symbols comprised in the first symbol set mapped to the first time-domain resource is a first symbol subset; when the priority of the first bit block is equal to the priority of the first information, a set of symbols comprised in the first symbol set mapped to the first time-domain resource is a second symbol subset; when the priority of the first bit block is lower than the priority of the first information, a set of symbols comprised in the first symbol set mapped to the first time-domain resource is a third symbol subset; the number of symbols comprised in the second symbol subset is unequal to the number of symbols comprised in the first symbol subset, and the number of symbols comprised in the third symbol subset is unequal to the number of symbols comprised in the first symbol subset.

In one subembodiment, the first symbol subset is a null set.

In one subembodiment, the symbols in the first symbol subset are mapped to the first time-domain resource through puncturing.

In one subembodiment, the symbols in the second symbol subset are mapped to the first time-domain resource through puncturing.

In one subembodiment, the symbols in the third symbol subset are mapped to the first time-domain resource through puncturing.

In one subembodiment, the symbols in the first symbol subset are mapped to the first time-domain resource through rate matching.

In one subembodiment, the symbols in the second symbol subset are mapped to the first time-domain resource through rate matching.

In one subembodiment, the symbols in the third symbol subset are mapped to the first time-domain resource through rate matching.

In one subembodiment, the symbols comprised in the third symbol subset are the same as those comprised in the second symbol subset.

In one subembodiment, the symbols comprised in the third symbol subset are different from those comprised in the second symbol subset.

In one embodiment, when the priority of the first bit block is a first priority and the priority of the first information is a second priority, a set of symbols comprised in the first symbol set mapped to the first time-domain resource is a first symbol subset; when the priority of the first bit block is the first priority and the priority of the first information is the first priority, a set of symbols comprised in the first symbol set mapped to the first time-domain resource is a second symbol subset; when the priority of the first bit block is the second priority and the priority of the first information is the second priority, a set of symbols comprised in the first symbol set mapped to the first time-domain resource is a third symbol subset; when the priority of the first bit block is the second priority and the priority of the first information is the first priority, a set of symbols comprised in the first symbol set mapped to the first time-domain resource is a fourth symbol subset.

In one subembodiment, the first symbol subset is a null set.

In one subembodiment, the symbols in the first symbol subset are mapped to the first time-domain resource through puncturing.

In one subembodiment, the symbols in the second symbol subset are mapped to the first time-domain resource through puncturing.

In one subembodiment, the symbols in the third symbol subset are mapped to the first time-domain resource through puncturing.

In one subembodiment, the symbols in the fourth symbol subset are mapped to the first time-domain resource through puncturing.

In one subembodiment, the symbols in the first symbol subset are mapped to the first time-domain resource through rate matching.

In one subembodiment, the symbols in the second symbol subset are mapped to the first time-domain resource through rate matching.

In one subembodiment, the symbols in the third symbol subset are mapped to the first time-domain resource through rate matching.

In one subembodiment, the symbols in the fourth symbol subset are mapped to the first time-domain resource through rate matching.

In one subembodiment, the symbols comprised in the third symbol subset are the same as the symbols comprised in the second symbol subset.

In one subembodiment, the symbols comprised in the third symbol subset are different from the symbols comprised in the second symbol subset.

In one subembodiment, among the number of symbols comprised in the first symbol subset, the number of symbols comprised in the second symbol subset, the number of symbols comprised in the third symbol subset and the number of symbols comprised in the fourth subset, there are at least two numbers different from each other.

Embodiment 7

Embodiment 7 illustrates a schematic diagram of relations among a number of symbols comprised in a first symbol set mapped to a first time-domain resource, a priority of a first bit block and a priority of first information according to one embodiment of the present disclosure, as shown in FIG. 7.

In Embodiment 7, the number of symbols comprised in the first symbol set mapped to the first time-domain resource is related to the priority of the first bit block and the priority of the first information.

In one embodiment, when the priority of the first bit block is a first priority and the priority of the first information is a second priority, a number of symbols comprised in the first symbol set mapped to the first time-domain resource is a sixth value; when the priority of the first bit block is the first priority and the priority of the first information is the first priority, a number of symbols comprised in the first symbol set mapped to the first time-domain resource is a seventh value; when the priority of the first bit block is the second priority and the priority of the first information is the second priority, a number of symbols comprised in the first symbol set mapped to the first time-domain resource is an eighth value; when the priority of the first bit block is the second priority and the priority of the first information is the first priority, a number of symbols comprised in the first symbol set mapped to the first time-domain resource is a ninth value.

In one subembodiment, the first priority is Higher Priority, and the second priority is Low Priority.

In one subembodiment, the sixth value is smaller than the seventh value, the sixth value is smaller than the eighth value, and the sixth value is smaller than the ninth value.

In one subembodiment, the sixth value is equal to 0.

In one subembodiment, the sixth value is equal to 0, the seventh value is greater than 0, the eighth value is greater than 0, and the ninth value is greater than 0.

In one subembodiment, the sixth value is greater than 0, the sixth value is smaller than the seventh value, the sixth value is smaller than the eighth value, and the sixth value is smaller than the ninth value.

In one subembodiment, the seventh value is smaller than the ninth value.

In one embodiment, when the priority of the first bit block is higher than the priority of the first information, a number of symbols comprised in the first symbol set mapped to the first time-domain resource is a sixth value; when the priority of the first bit block is equal to the priority of the first information, a number of symbols comprised in the first symbol set mapped to the first time-domain resource is a seventh value; when the priority of the first bit block is lower than the priority of the first information, a number of symbols comprised in the first symbol set mapped to the first time-domain resource is an eighth value; the sixth value is smaller than the seventh value, and the sixth value is smaller than the eighth value.

In one subembodiment, the sixth value is equal to 0.

In one subembodiment, the sixth value is greater than 0.

In one subembodiment, the seventh value is smaller than the eighth value.

In one embodiment, when the priority of the first bit block is higher than the priority of the first information, a number of symbols comprised in the first symbol set mapped to the first time-domain resource is equal to a sixth value; otherwise, the number of symbols comprised in the first symbol set mapped to the first time-domain resource is greater than the sixth value; the sixth value is greater than or equal to 0.

Embodiment 8

Embodiment 8 illustrates a schematic diagram of relations among a number of symbols comprised in a second symbol set mapped to a first time-domain resource, a priority of a first bit block and a priority of first information according to one embodiment of the present disclosure, as shown in FIG. 8.

In Embodiment 8, the number of symbols comprised in the first symbol set mapped to the first time-domain resource is related to the priority of the first bit block and the priority of the first information.

In one embodiment, when the priority of the first bit block is higher than the priority of the first information, a number of symbols comprised in the second symbol set mapped to the first time-domain resource is greater than 0.

In one embodiment, when the priority of the first bit block is not higher than the priority of the first information, a number of symbols comprised in the second symbol set mapped to the first time-domain resource is equal to 0.

In one embodiment, when the priority of the first bit block is higher than the priority of the first information, a number of symbols comprised in the second symbol set mapped to the first time-domain resource is equal to a fourth value; otherwise, the number of symbols comprised in the second symbol set mapped to the first time-domain resource is equal to a fifth value; the fifth value is smaller than the fourth value.

In one subembodiment, the fifth value is equal to 0.

In one subembodiment, the fifth value is greater than 0.

In one subembodiment, the fourth value is equal to 0.

In one subembodiment, the fourth value is greater than 0.

In one embodiment, the priority of the first bit block and the priority of the first information are jointly used to determine a ratio of the number of symbols comprised in the first symbol set mapped to the first time-domain resource to the number of symbols comprised in the second symbol set mapped to the first time-domain resource.

In one embodiment, when the priority of the first bit block is higher than the priority of the first information, a number of symbols comprised in the second symbol set mapped to the first time-domain resource is equal to a fourth value, and a number of symbols comprised in the first symbol set mapped to the first time-domain resource is equal to the first value; otherwise, the number of symbols comprised in the second symbol set mapped to the first time-domain resource is equal to a fifth value, and the number of symbols comprised in the first symbol set mapped to the first time-domain resource is equal to the second value; the fifth value is smaller than the fourth value, and the second value is greater than the first value.

In one subembodiment, the fifth value is equal to 0.

In one subembodiment, the fifth value is greater than 0.

In one subembodiment, the fourth value is equal to 0.

In one subembodiment, the fourth value is greater than 0.

In one subembodiment, the first value is equal to 0.

In one subembodiment, the first value is greater than 0.

In one subembodiment, the fifth value is equal to 0, and the first value is greater than 0.

In one subembodiment, the fifth value is greater than 0, and the first value is equal to 0.

In one subembodiment, the fifth value is greater than 0, and the first value is greater than 0.

In one subembodiment, a sum of the fifth value and the second value is equal to a maximum number of symbols that the first time-domain resource is allowed to bear.

In one subembodiment, a sum of the fifth value and the second value is smaller than a maximum number of symbols that the first time-domain resource is allowed to bear.

In one subembodiment, a sum of the fourth value and the first value is equal to a maximum number of symbols that the first time-domain resource is allowed to bear.

In one subembodiment, a sum of the fourth value and the first value is smaller than a maximum number of symbols that the first time-domain resource is allowed to bear.

In one embodiment, when the priority of the first bit block is higher than the priority of the first information, symbols in the second symbol set are the first to be mapped to the first time-domain resource; otherwise, symbols in the first symbol set are the first to be mapped to the first time-domain resource.

Embodiment 9

Embodiment 9 illustrates a schematic diagram of relations among a time-domain resource occupied by a first reference signal, a first time-domain resource and a second time-domain resource according to one embodiment of the present disclosure, as shown in FIG. 9. In FIG. 9, the blank rectangular box represents the first time-domain resource, the gray rectangular box represents the second time-domain resource, and the vertical-line filled rectangular box represents the time-domain resource occupied by the first reference signal.

In Embodiment 9, the first time-domain resource is adjacent to the time-domain resource occupied by the first reference signal; the second time-domain resource is not adjacent to the time-domain resource occupied by the first reference signal.

In one embodiment, the first reference signal is used for channel measurement.

In one embodiment, the first reference signal is used for data demodulation.

In one embodiment, the first reference signal is used for phase tracking.

In one embodiment, the first reference signal is a Demodulation Reference Signal (DMRS).

In one embodiment, the first reference signal is a Phase-tracking Reference Signal (PTRS).

In one embodiment, the first reference signal is a Channel State Information Reference Signal (CSI-RS).

In one embodiment, the first time-domain resource comprises a first OFDM symbol after an OFDM symbol occupied by the first reference signal in time domain.

In one embodiment, the first reference signal is a first DMRS in the first time-frequency resource.

In one embodiment, the first time-domain resource and the time-domain resource occupied by the first reference signal are not overlapping in time domain.

In one embodiment, the first time-domain resource comprises a first OFDM symbol after a first DMRS comprised in the first time-frequency resource in time domain.

In one embodiment, in time domain the second time-domain resource is an OFDM symbol other than a first OFDM symbol after an OFDM symbol occupied by the first reference signal.

In one embodiment, in time domain the second time-domain resource is a multicarrier symbol other than a first multicarrier symbol after a multicarrier symbol occupied by the first reference signal.

In one embodiment, the first time-domain resource is a first multicarrier symbol after a multicarrier symbol occupied by the first reference signal in time domain.

Embodiment 10

Figures 10, 11, 12:
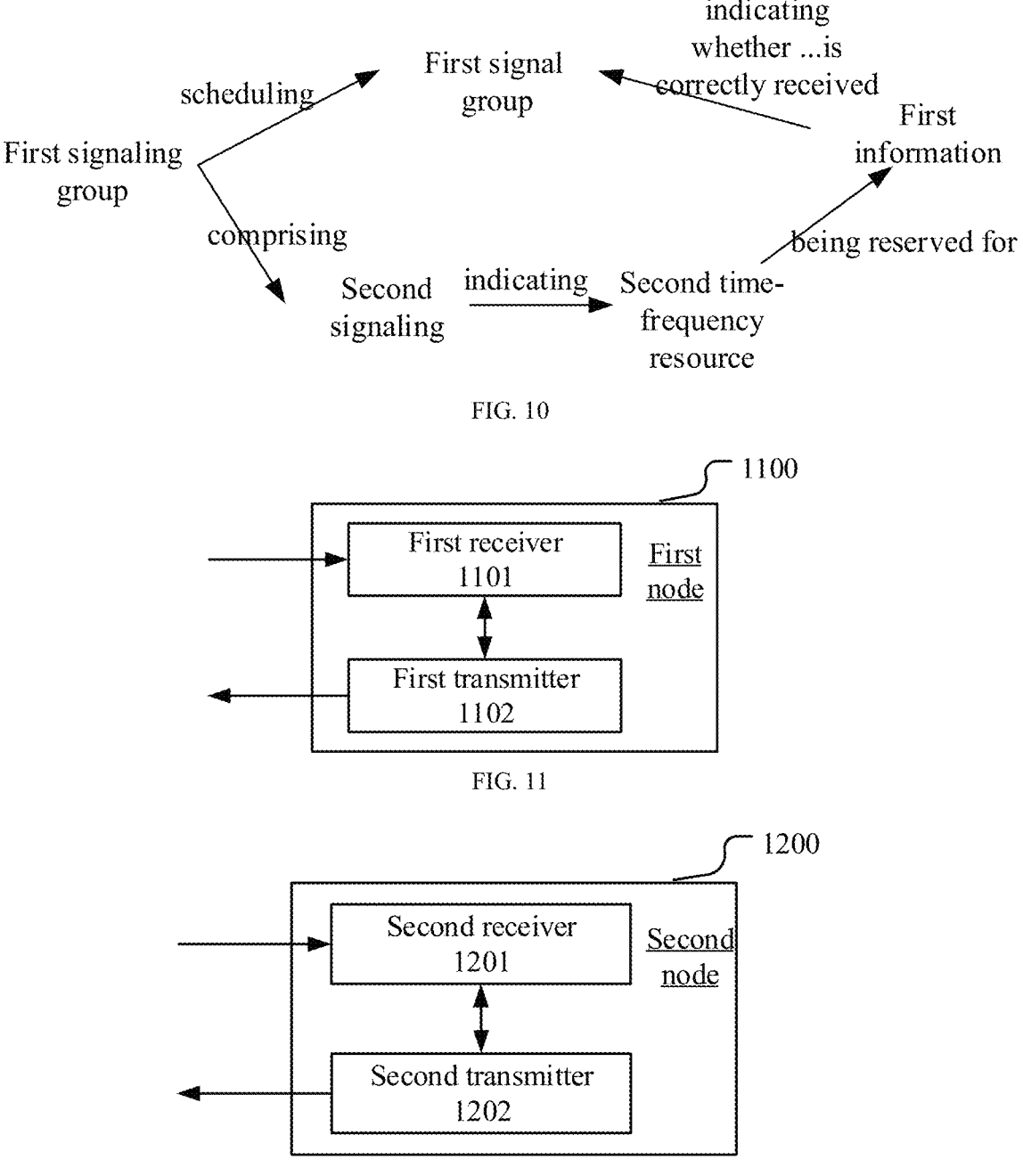
FIG. 10 illustrates a schematic diagram of relations among a first signal group, a first signaling group, and a second signaling, a second time-frequency resource and first information according to one embodiment of the present disclosure.
FIG. 11 illustrates a structure block diagram of a processing device in a first node according to one embodiment of the present disclosure.
FIG. 12 illustrates a structure block diagram of a processing device in a second node according to one embodiment of the present disclosure.

Embodiment 10 illustrates a schematic diagram of relations among a first signal group, a first signaling group, and a second signaling, a second time-frequency resource and first information according to one embodiment of the present disclosure, as shown in FIG. 10.

In Embodiment 10, the first information is used for indicating whether a signal in the first signal group is correctly received, and the first signaling group comprises scheduling information of the first signal group, the second signaling is a last signaling in the first signaling group, and the second signaling indicates a second time-frequency resource, the second time-frequency resource being reserved for the first information; the second time-frequency resource is overlapping with the first time-frequency resource in the present disclosure in time domain.

In one embodiment, the second time-frequency resource is a time-frequency resource belonging to an uplink physical layer control channel (i.e., an uplink channel only capable of carrying a physical layer signaling).

In one subembodiment, the uplink physical layer control channel is a Physical Uplink Control Channel (PUCCH).

In one subembodiment, the uplink physical layer control channel is a short PUCCH (sPUCCH).

In one subembodiment, the uplink physical layer control channel is a New Radio PUCCH (NR-PUCCH).

In one subembodiment, the uplink physical layer control channel is a Narrow Band PUCCH (NB-PUCCH).

In one embodiment, the second time-frequency resource is a PUCCH resource reserved for the first information.

In one embodiment, a number of bits comprised in the first information is used for selecting a first time-frequency resource group from N time-frequency resource groups.

In one subembodiment, the N time-frequency resource groups are N PUCCH resource sets, and the first time-frequency resource group is one of the N PUCCH resource sets.

In one subembodiment, the first time-frequency resource group is a PUCCH resource set, and the second time-frequency resource is a PUCCH resource in the first time-frequency resource group.

In one subembodiment, the first time-frequency resource group is a PUCCH resource set, and the second time-frequency resource is a PUCCH resource selected from the first time-frequency resource group according to an indication by the second signaling.

In one embodiment, the second time-frequency resource comprises a positive integer number of RE(s).

In one embodiment, the second time-frequency resource comprises a positive integer number of multicarrier symbol(s) in time domain, and a positive integer number of subcarrier(s) in frequency domain.

In one embodiment, the first time-frequency resource and the second time-frequency resource are partially overlapping in time domain.

In one embodiment, the first time-frequency resource and the second time-frequency resource are totally overlapping in time domain.

In one embodiment, the scheduling information of the first signal group comprises one or more of a time-domain resource occupied, a frequency-domain resource occupied, an MCS, DMRS configuration information, a HARQ process ID, an RV, an NDI or a priority.

In one embodiment, the first signal group comprises M signals, and the first signaling group comprises M signalings, the M signalings respectively comprising scheduling information of the M signals.

In one embodiment, all signalings in the first signaling group indicate that feedback information is transmitted in a third time-domain resource.

In one subembodiment, the third time-domain resource is a slot.

In one subembodiment, the third time-domain resource is a sub-slot.

In one subembodiment, each signaling in the first signaling group comprises a PDSCH-to-HARQ_feedback timing indicator, the PDSCH-to-HARQ_feedback timing indicator being used to determine the third time-domain resource.

In one subembodiment, the feedback information comprises HARQ-ACK information.

In one embodiment, the phrase that a second signaling is a last signaling in the first signaling group includes that in time domain, a Monitoring Occasion of the second signaling is later than a Monitoring Occasion of any signaling in the first signaling group other than the second signaling.

In one embodiment, the phrase that a second signaling is a last signaling in the first signaling group includes that in time domain, a Monitoring Occasion of the second signaling is no earlier than a Monitoring Occasion of any signaling in the first signaling group other than the second signaling.

In one embodiment, the phrase that a second signaling is a last signaling in the first signaling group includes that in time domain, a last symbol in the second signaling is later than a last symbol in any signaling in the first signaling group other than the second signaling.

In one embodiment, the phrase that a second signaling is a last signaling in the first signaling group includes that in time domain, a last symbol in the second signaling is no earlier than a last symbol in any signaling in the first signaling group other than the second signaling.

In one embodiment, the phrase that a second signaling is a last signaling in the first signaling group includes that the first signaling group comprises multiple pieces of DCI, and the multiple pieces of DCI indicate a same PUCCH transmission time, the second signaling being a last piece of DCI in the first signaling group.

Embodiment 11

Embodiment 11 illustrates a structure block diagram of a processing device in a first node according to one embodiment of the present disclosure, as shown in FIG. 11. In FIG. 11, a processing device 1100 in a first node comprises a first receiver 1101 and a first transmitter 1102.

In Embodiment 11, the first receiver 1101 receives a first signaling and a first signal group; the first transmitter 1102 transmits a second signal in a first time-frequency resource, the second signal carrying a first bit block and first information.

In Embodiment 11, the first bit block carries user data; the first signaling comprises scheduling information of the second signal; the first information comprises information indicating whether one or more signals in the first signal group is/are correctly received; the first time-frequency resource comprises a first time-domain resource in time domain; a first symbol set is composed of modulation symbol(s) generated by the first information, and a number of symbols comprised in the first symbol set mapped to the first time-domain resource is related to a priority of the first bit block and a priority of the first information.

In one embodiment, the first transmitter 1102 transmits a first reference signal in the first time-frequency resource, and a time-domain resource occupied by the first reference signal is adjacent to the first time-domain resource.

In one embodiment, a second symbol set is composed of modulation symbol(s) generated by the first bit block, and a number of symbols comprised in the second symbol set mapped to the first time-domain resource is related to the priority of the first bit block and the priority of the first information.

In one embodiment, when the priority of the first bit block is higher than the priority of the first information, the number of symbols comprised in the first symbol set mapped to the first time-domain resource is equal to a first value; otherwise, the number of symbols comprised in the first symbol set mapped to the first time-domain resource is equal to a second value; the second value is greater than the first value.

In one embodiment, when the priority of the first bit block is higher than the priority of the first information, a second time-domain resource is used for carrying the first symbol set; the second time-domain resource is not adjacent to a time-domain resource occupied by the first reference signal.

In one embodiment, the first information comprises a second bit block, and a number of bits comprised in the second bit block is greater than a third value.

In one embodiment, the first receiver 1101 receives a first signaling group; herein, the first signaling group comprises scheduling information of the first signal group, a second signaling is a last signaling in the first signaling group, and the second signaling indicates a second time-frequency resource, the second time-frequency resource being reserved for the first information; the second time-frequency resource and the first time-frequency resource are overlapping in time domain.

In one embodiment, the first time-frequency resource is a PUSCH, the first information comprises HARQ-ACK information, and the first bit block comprises user data, the first reference signal is a DMRS mapped onto the PUSCH, the first time-domain resource is a first multicarrier symbol after a multicarrier symbol occupied by the first reference signal, and the first symbol set is composed of modulation symbol(s) generated by the first information; when the priority of the first bit block is higher than the priority of the first information, a number of symbols comprised in the first symbol set mapped to the first time-domain resource is equal to the first value; otherwise, the number of symbols comprised in the first symbol set mapped to the first time-domain resource is equal to the second value; the second value is greater than the first value.

In one embodiment, the first time-frequency resource is a PUSCH, the first information comprises HARQ-ACK information, and the first bit block comprises user data, the first reference signal is a DMRS mapped onto the PUSCH, the first time-domain resource is a first multicarrier symbol after a multicarrier symbol occupied by the first reference signal, and the first symbol set is composed of modulation symbol(s) generated by the first information; when the priority of the first bit block is higher than the priority of the first information, a number of symbols comprised in the first symbol set mapped to the first time-domain resource is equal to 0; otherwise, the number of symbols comprised in the first symbol set mapped to the first time-domain resource is greater than 0.

In one embodiment, the first time-frequency resource is a PUSCH, the first information comprises HARQ-ACK information, and the first bit block comprises user data, the first time-domain resource is a multicarrier symbol on the PUSCH, and the first symbol set is composed of modulation symbol(s) generated by the first information; when the priority of the first bit block is higher than the priority of the first information, a number of symbols comprised in the first symbol set mapped to the first time-domain resource is equal to a sixth value; otherwise, the number of symbols comprised in the first symbol set mapped to the first time-domain resource is greater than the sixth value; the sixth value is greater than or equal to 0.

In one embodiment, the first time-frequency resource is a PUSCH, the first information comprises HARQ-ACK information, and the first bit block comprises user data, the first reference signal is a first DMRS mapped onto the PUSCH, the first time-domain resource is a first multicarrier symbol after a multicarrier symbol occupied by the first reference signal, and the first symbol set is composed of modulation symbol(s) generated by the first information; when the priority of the first bit block is higher than the priority of the first information, a number of symbols comprised in the first symbol set mapped to the first time-domain resource is equal to a sixth value; otherwise, the number of symbols comprised in the first symbol set mapped to the first time-domain resource is greater than the sixth value; the sixth value is greater than or equal to 0.

In one embodiment, the first time-frequency resource is a PUSCH, the first information comprises HARQ-ACK information, and the first bit block comprises user data, the first reference signal is a first DMRS mapped onto the PUSCH, the first time-domain resource is a first OFDM symbol after an OFDM symbol occupied by the first reference signal, and the first symbol set is composed of modulation symbol(s) generated by the first information; when the priority of the first bit block is higher than the priority of the first information, a number of symbols comprised in the first symbol set mapped to the first time-domain resource is equal to a sixth value; otherwise, the number of symbols comprised in the first symbol set mapped to the first time-domain resource is greater than the sixth value; the sixth value is greater than or equal to 0.

In one embodiment, the first time-frequency resource is a PUSCH, the first information comprises HARQ-ACK information, and the first bit block comprises user data, the first reference signal is a first DMRS mapped onto the PUSCH, the first time-domain resource is a first OFDM symbol after an OFDM symbol occupied by the first reference signal, and the first symbol set is composed of modulation symbol(s) generated by the first information; when the priority of the first bit block is higher than the priority of the first information, a number of symbols comprised in the first symbol set mapped to the first time-domain resource is equal to 0; otherwise, the number of symbols comprised in the first symbol set mapped to the first time-domain resource is greater than 0.

In one embodiment, the first time-frequency resource is a PUSCH, the first information comprises HARQ-ACK information, and the first bit block comprises user data, the first reference signal is a first DMRS mapped onto the PUSCH, the first time-domain resource is a first OFDM symbol after an OFDM symbol occupied by the first reference signal, and the first symbol set is composed of modulation symbol(s) generated by the first information; when the priority of the first bit block is higher than the priority of the first information, a number of symbols comprised in the first symbol set mapped to the first time-domain resource is equal to the first value; otherwise, the number of symbols comprised in the first symbol set mapped to the first time-domain resource is equal to the second value; the second value is greater than the first value.

In one embodiment, the first node is a UE.

In one embodiment, the first node is a relay node.

In one embodiment, the first receiver 1101 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1102 comprises at least one of the antenna 452, the transmitter 454, the transmitting processor 468, the multi-antenna transmitting processor 457, the controller/processor 459, the memory 460 or the data source 467 in Embodiment 4.

Embodiment 12

Embodiment 12 illustrates a structure block diagram of a processing device in a second node according to one embodiment of the present disclosure, as shown in FIG. 12.

In FIG. 12, a processing device 1200 in a second node comprises a second receiver 1201 and a second transmitter 1202.

In Embodiment 12, the second transmitter 1202 transmits a first signaling and a first signal group; the second receiver 1201 receives a second signal in a first time-frequency resource, the second signal carrying a first bit block and first information.

In Embodiment 12, the first bit block carries user data; the first signaling comprises scheduling information of the second signal; the first information comprises information indicating whether one or more signals in the first signal group is/are correctly received; the first time-frequency resource comprises a first time-domain resource in time domain; a first symbol set is composed of modulation symbol(s) generated by the first information, and a number of symbols comprised in the first symbol set mapped to the first time-domain resource is related to a priority of the first bit block and a priority of the first information.

In one embodiment, the second receiver 1201 receives a first reference signal in the first time-frequency resource, and a time-domain resource occupied by the first reference signal is adjacent to the first time-domain resource.

In one embodiment, a second symbol set is composed of modulation symbol(s) generated by the first bit block, and a number of symbols comprised in the second symbol set mapped to the first time-domain resource is related to the priority of the first bit block and the priority of the first information.

In one embodiment, when the priority of the first bit block is higher than the priority of the first information, the number of symbols comprised in the first symbol set mapped to the first time-domain resource is equal to a first value; otherwise, the number of symbols comprised in the first symbol set mapped to the first time-domain resource is equal to a second value; the second value is greater than the first value.

In one embodiment, when the priority of the first bit block is higher than the priority of the first information, a second time-domain resource is used for carrying the first symbol set; the second time-domain resource is not adjacent to a time-domain resource occupied by the first reference signal.

In one embodiment, the first information comprises a second bit block, and a number of bits comprised in the second bit block is greater than a third value.

In one embodiment, the second transmitter 1202 transmits a first signaling group; herein, the first signaling group comprises scheduling information of the first signal group, a second signaling is a last signaling in the first signaling group, and the second signaling indicates a second time-frequency resource, the second time-frequency resource being reserved for the first information; the second time-frequency resource and the first time-frequency resource are overlapping in time domain.

In one embodiment, the second node is a UE.

In one embodiment, the second node is a relay node.

In one embodiment, the second node is a base station.

In one embodiment, the second receiver 1201 comprises at least one of the antenna 420, the receiver 418, the receiving processor 470, the controller/processor 475 or the memory 476 in Embodiment 4.

In one embodiment, the second transmitter 1202 comprises at least one of the antenna 420, the transmitter 418, the transmitting processor 416, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE), comprising:

a receiver configured to:

receive scheduling information; and receive downlink data; and a transmitter configured to transmit uplink data or hybrid automatic repeat request acknowledgement (HARQ-ACK) information for the downlink data on a physical uplink shared channel (PUSCH), wherein a first number of the first modulation symbols is based on a priority of the uplink data and a priority of the HARQ-ACK information, wherein on a condition that the priority of the uplink data is higher than the priority of the HARQ-ACK information, the first number of the first modulation symbols is 0, and on a condition that the priority of the uplink data is lower than the priority of the HARQ-ACK information, the first number of the first modulation symbols is greater than 0.

2. The UE according to claim 1, wherein the transmitter is configured to transmit a first signal in a first time-domain resource adjacent to a second first time-domain resource of the PUSCH.

3. The UE according to claim 1, wherein:

on a condition that the priority of the uplink data is higher than the priority of the HARQ-ACK information, the first number of symbols is equal to a first value, and on a condition that the priority of the uplink data is not higher than the priority of the HARQ-ACK information, the first number of symbols is equal to a second value that is greater than the first value, or on a condition that the priority of the uplink data is a first priority and the priority of the HARQ-ACK information is a second priority, the first number of symbols is equal to 0, on a condition that the priority of the uplink data is the first priority and the priority of the HARQ-ACK information is the first priority, the first number of symbols is greater than 0, on a condition that the priority of the uplink data is the second priority and the priority of the HARQ-ACK information is the second priority, the first number of symbols is greater than 0, on a condition that the priority of the uplink data is the second priority and the priority of the HARQ-ACK information is the first priority, the first number of symbols is equal to 0, and the first priority is higher than the second priority.

4. The UE according to claim 1, wherein the uplink data is represented by second modulation symbols, and a second number of the second modulation symbols is related to the priority of the uplink data and the priority of the HARQ-ACK information, or wherein the scheduling information indicates a time-frequency resource of the HARQ-ACK information.

5. A base station, comprising:
a transmitter configured to:
    transmit scheduling information; and
    transmit downlink data; and
a receiver configured to receive uplink data or hybrid automatic repeat request acknowledgement (HARQ-ACK) information for the downlink data on a physical uplink shared channel (PUSCH), wherein the HARQ-ACK information is represented by first modulation symbols, and wherein
a number of the first modulation symbols is based on a priority of the uplink data and a priority of the HARQ-ACK information, wherein on a condition that the priority of the uplink data is higher than the priority of the HARQ-ACK information, the first number of the first modulation symbols is 0, and on a condition that the priority of the uplink data is lower than the priority of the HARQ-ACK information, the first number of the first modulation symbols is greater than 0.

6. The base station according to claim 5, wherein the receiver is configured to receive a first signal in a second
time-domain resource adjacent to a first time-domain resource.

7. The base station according to claim 6, wherein:
on a condition that the priority of the uplink data is higher than the priority of the HARQ-ACK information, the first number of symbols is equal to a first value, and on a condition that the priority of the uplink data is not higher than the priority of the HARQ- ACK information, the first number of symbols is equal to a second value that is greater than the first value, or on a condition that the priority of the uplink data is a first priority and the priority of the HARQ-ACK information is a second priority, the first number of symbols is equal to 0, on a condition that the priority of the uplink data is the first priority and the priority of the HARQ- ACK information is the first priority, the first number of symbols is greater than 0; on a condition that the priority of the uplink data is the second priority and the priority of the HARQ-ACK information is the second priority, the first number of symbols is greater than 0, on a condition that the priority of the uplink data is the second priority and the priority of the HARQ-ACK information is the first priority, the first number of symbols is equal to 0, and the first priority is higher than the second priority.

8. The base station according to claim 5, wherein
the uplink data is represented by second modulation symbols, and a second number of the second modulation symbols is related to the priority of the uplink data and the priority of the HARQ-ACK information;

or:

the scheduling information indicates a time-frequency resource of the HARQ-ACK information.

9. A method comprising:
receiving scheduling information and downlink data; and
transmitting uplink data or hybrid automatic repeat request acknowledgement (HARQ-ACK) information for the downlink data on a physical uplink shared channel (PUSCH), wherein the HARQ-ACK information is represented by first modulation symbols, and wherein
a first number of the first modulation symbols based on a priority of the uplink data and a priority of the HARQ-ACK information, wherein on a condition that the priority of the uplink data is higher than the priority of the HARQ-ACK information, the first number of the first modulation symbols is 0, and on a condition that the priority of the uplink data is lower than the priority of the HARQ-ACK information, the first number of the first modulation symbols is greater than 0.

10. The method according to claim 9, comprising:
transmitting a first signal in
a first time-domain resource that is adjacent to a second time-domain resource of the PUSCH.

11. The method according to any of claim 9, wherein:
on a condition that the priority of the uplink data is higher than the priority of the HARQ-ACK information, the first number of symbols is equal to a first value; and on a condition that the priority of the uplink data is not higher than the priority of the HARQ- ACK information, the first number of symbols is equal to a second value that is greater than the first value, or on a condition that the priority of the uplink data is a first priority and the priority of the HARQ-ACK information is a second priority, the first number of symbols is equal to 0, on a condition that the priority of the uplink data is the first priority and the priority of the HARQ-ACK information is the first priority, the first number of symbols is greater than 0, on a condition that the priority of the uplink data is the second priority and the priority of the HARQ-ACK information is the second priority, the first number of symbols is greater than 0, on a condition that the priority of the uplink data is the second priority and the priority of the HARQ-ACK information is the first priority, the first number of symbols is equal to 0, and the first priority is higher than the second priority.

12. The method according to claim 9, wherein:
the uplink data is represented by second modulation symbols, and a second number of the second modulation symbols is related to the priority of the uplink data and the priority of the HARQ-ACK information,
the scheduling information
indicates a time-frequency resource of the HARQ-ACK information.

35

13. A method, comprising:

transmitting scheduling information and downlink data; and receiving uplink data or hybrid automatic repeat request acknowledgement (HARQ-ACK) information for the downlink data on a physical uplink shared channel PUSCH), wherein the HARQ-ACK information is represented by first modulation symbols, and wherein a first number of the first modulation symbols is based on a priority of the uplink data and a priority of the HARQ-ACK information, wherein on a condition that the priority of the uplink data is higher than the priority of the HARQ-ACK information, the first number of the first modulation symbols is 0, and on a condition that the priority of the uplink data is lower than the priority of the HARQ-ACK information, the first number of the first modulation symbols is greater than 0.

14. The method according to claim 13, comprising:

receiving a first signal in a second time-domain resource that is adjacent to a first time-domain resource of the PUSCH.

15. The method according to claim 13, wherein:

on a condition that the priority of the uplink data is higher than the priority of the HARQ-ACK information, the first of symbols is equal to a first value, and on a condition that the priority of the uplink data is not higher than the priority of the HARQ- ACK information, the first number of symbols is equal to a second value that is greater than the first value, or on a condition that the priority of the uplink data is a first priority and the priority of the HARQ-ACK information is a second priority, the first number of symbols is equal to 0, on a condition that the priority of the uplink data is the first priority and the priority of the HARQ-ACK information is the first priority, the first number of symbols is greater than 0, on a condition that the priority of the uplink data is the second priority and the priority of the HARQ-ACK information is the second priority, the first number of symbols is greater than 0, on a condition that the priority of the uplink data is the second priority and the priority of the HARQ-ACK information is the first priority, the first number of symbols is equal to 0, and the first priority is higher than the second priority.

16. The method in the second node according to claim 13, wherein: p1 the uplink data is represented by second modulation symbols, and a second number of the second modulation symbols is related to the priority of the uplink data and the priority of the HARQ-ACK information, or the scheduling information indicates a time-frequency resource of the HARQ-ACK information.

* * * * *